US011867164B2

(12) United States Patent
Berning et al.

(10) Patent No.: US 11,867,164 B2
(45) Date of Patent: Jan. 9, 2024

(54) COMPRESSOR WITH COOLING PUMP (71) Applicant: Copeland LP, Sidney, OH (US)

(72) Inventors: Jeffrey Lee Berning, Fort Laramie, OH (US); Robert C. Stover, Versailles, OH (US)

(73) Assignee: Copeland LP, Sidney, OH (US)

( * ) Notice: Subject to any disclaimer, the term of this patent is extended or adjusted under 35 U.S.C. 154(b) by 154 days.

(21) Appl. No.: 17/369,730

(22) Filed: Jul. 7, 2021

(65) Prior Publication Data

US 2023/0012130 A1 Jan. 12, 2023

(51) Int. Cl.
*F04B 39/06* (2006.01)
*F04C 18/32* (2006.01)
*F25B 31/02* (2006.01)
*H02K 9/18* (2006.01)
*H02K 9/19* (2006.01)
(Continued)

(52) U.S. Cl.
CPC ............ *F04B 39/06* (2013.01); *F04C 18/321* (2013.01); *F04C 29/0085* (2013.01); *F04C 29/042* (2013.01); *F25B 31/02* (2013.01); *F04B 53/08* (2013.01); *F04C 18/0215* (2013.01); *F04C 2240/807* (2013.01); *F25B 31/008* (2013.01); *F25B 31/026* (2013.01); *H02K 1/32* (2013.01); *H02K 9/14* (2013.01); *H02K 9/18* (2013.01); *H02K 9/19* (2013.01)

(58) Field of Classification Search
CPC ........ F04B 39/06; F04B 53/08; F04C 18/321; F04C 18/0215; F04C 29/0085; F04C 29/042; F04C 2240/807; F25B 31/02; F25B 31/008; F25B 31/026; H02K 1/32; H02K 9/14; H02K 9/18; H02K 9/19

USPC .......................................................... 417/363
See application file for complete search history.

(56) References Cited

U.S. PATENT DOCUMENTS 3,105,633 A 10/1963 Dellario
4,049,410 A 9/1977 Miller
(Continued)

FOREIGN PATENT DOCUMENTS

JP H06317264 A 11/1994
KR 20060035061 A 4/2006
(Continued)

OTHER PUBLICATIONS

N.I. Dreiman, et al., Hermetic Compressor With Improved Motor Cooling, Purdue e-Pubs, International Compressor Engineering Conference, 2002, 9 pages.
(Continued)

*Primary Examiner* — Charles G Freay
(74) *Attorney, Agent, or Firm* — Harness, Dickey & Pierce, P.L.C.

(57) ABSTRACT

A compressor includes a compression mechanism, a motor, a drive shaft, and a motor cooler. The compressor is configured to compress a working fluid. The motor dives the compression mechanism and is housed within a motor housing. The drive shaft is engaged with the motor and the compression mechanism and is configured to drive operation of the compression mechanism. The motor cooler is disposed adjacent the motor and is configured to pump a cooling working fluid around the motor. The motor cooler includes a pump that pumps the cooling working fluid into the motor housing based on a rotational speed of the drive shaft.

18 Claims, 11 Drawing Sheets

(51) Int. Cl.
  *F04C 29/04* (2006.01)
  *F04C 29/00* (2006.01)
  *F25B 31/00* (2006.01)
  *F04C 18/02* (2006.01)
  *H02K 9/14* (2006.01)
  *H02K 1/32* (2006.01)
  *F04B 53/08* (2006.01)

(56) References Cited

U.S. PATENT DOCUMENTS

| | | | |
|---|---|---|---|
| 4,614,482 A * | 9/1986 | Gaffal | H02K 5/12 |
| | | | 417/373 |
| 5,007,809 A | 4/1991 | Kimura et al. | |
| 5,214,932 A * | 6/1993 | Abdelmalek | F25B 11/04 |
| | | | 62/332 |
| 5,304,047 A | 4/1994 | Shibamoto | |
| 6,634,870 B2 | 10/2003 | Dreiman et al. | |
| 6,672,088 B2 | 1/2004 | Ueda | |
| 6,752,605 B2 | 6/2004 | Dreiman et al. | |
| 6,929,455 B2 | 8/2005 | Dreiman et al. | |
| 9,239,054 B2 | 1/2016 | Ignatiev et al. | |
| 9,816,733 B2 | 11/2017 | Haley et al. | |
| 10,030,672 B2 | 7/2018 | Gilarranz et al. | |
| 10,670,017 B2 * | 6/2020 | Lee | F04C 29/0085 |
| 2014/0140868 A1 * | 5/2014 | Ignatiev | F04C 23/008 |
| | | | 417/372 |
| 2014/0216103 A1 * | 8/2014 | Ignatiev | F04C 2/344 |
| | | | 62/470 |

FOREIGN PATENT DOCUMENTS

| | | |
|---|---|---|
| KR | 100575816 B1 | 5/2006 |
| WO | WO-2020142712 A1 | 7/2020 |

OTHER PUBLICATIONS

International Search Report regarding Application No. PCT/US2022/034727 dated Oct. 7, 2022.

Written Opinion of the ISA regarding Application No. PCT/US2022/034727 dated Oct. 7, 2022.

* cited by examiner

COMPRESSOR WITH COOLING PUMP

FIELD

The present disclosure relates to compressors in refrigeration systems and, more particularly, to compressors having a cooling pump.

BACKGROUND

This section provides background information related to the present disclosure which is not necessarily prior art.

Cooling systems, refrigeration systems, heat-pump systems, and other climate-control systems include a fluid circuit having a condenser, an evaporator, an expansion device disposed between the condenser and evaporator, and a compressor circulating a working fluid between the condenser and the evaporator. Efficient and reliable operation of the compressor is desirable to ensure that the cooling, refrigeration, or heat pump system in which the compressor is incorporated is capable of effectively and efficiently providing a cooling and/or heating effect on demand.

The compressor takes working fluid from a suction end, compresses the fluid, and discharges the working fluid through a discharge outlet. The compression process generates heat within the compressor. In some cases, the heat may be dissipated naturally. However, in some cases, additional cooling may be necessary to dissipate heat and reduce motor temperatures. Reduction in motor temperatures reduces the potential for motor overheating and failure.

SUMMARY

This section provides a general summary of the disclosure, and is not a comprehensive disclosure of its full scope or all of its features.

An example compressor according to the present disclosure includes a compression mechanism, a motor, a drive shaft, and a motor cooler. The compressor is configured to compress a working fluid. The motor drives the compression mechanism and is housed within a motor housing. The drive shaft is engaged with the motor and the compression mechanism and is configured to drive operation of the compression mechanism. The motor cooler is disposed adjacent the motor and is configured to pump a cooling working fluid around the motor. The motor cooler includes a pump that pumps the cooling working fluid into the motor housing based on a rotational speed of the drive shaft.

The example compressor may include an upper counterweight fixed for rotation with the drive shaft. The upper counterweight may be disposed between the motor and the motor cooler.

The pump may be a ring-shaped pump disposed within a central aperture of a pump housing. The pump may move about a circumference of the central aperture with rotation of the drive shaft.

The example compressor may include an eccentric drive mechanism that is fixed for rotation with the upper counterweight. The eccentric drive mechanism may include an axial sleeve that engages an inner circumference of the pump. Rotation of the eccentric drive mechanism may drive movement of the pump within the pump housing.

The eccentric drive mechanism may be fixed to the upper counterweight by a fastener.

The eccentric drive mechanism may include a plurality of tabs projecting from a radially-extending base. The plurality of tabs may engage the upper counterweight to prevent relative rotation between the eccentric drive mechanism and the upper counterweight.

The example compressor may include a shell housing the motor, the drive shaft, and the motor cooler.

The motor cooler may be fluidly connected to a heat exchanger external to the shell.

The cooling working fluid may be a gas or a liquid-gas mixture.

The cooling working fluid may include a refrigerant.

An example compressor motor cooler according to the present disclosure may include a cooling housing, a pump housing, and a pump. The cooling housing may have a fluid inlet and a fluid outlet. The pump housing may have a central aperture defining an inlet notch and an outlet notch. The pump may be disposed within the central aperture and may move about a circumference of the central aperture to pump a working fluid from the fluid inlet, through the inlet notch, about the central aperture, through the outlet notch, and to the fluid outlet.

The compressor motor cooler may include an upper thrust plate disposed between the cooling housing and the pump housing. The upper thrust plate may have an inlet aperture aligning with the fluid inlet of the cooling housing and the inlet notch of the pump housing and an outlet aperture aligning with the fluid outlet of the cooling housing and the outlet notch of the pump housing.

The compressor motor cooler may include a lower thrust plate disposed on a side of the pump housing opposite the upper thrust plate. The lower thrust plate, the pump housing, the upper thrust plate, and the cooling housing are fixed together.

The cooling housing may include an annular channel in fluid communication with the fluid outlet and configured to receive fluid from the fluid outlet and disperse fluid about a circumference of the cooling housing.

The cooling housing may include a plurality of exit apertures in fluid communication with the annular channel.

An example compressor according to the present disclosure includes a compression mechanism, a bearing housing, a motor, a drive shaft, and a motor cooler. The compression mechanism may be configured to compress a first working fluid. The bearing housing may be engaged with the compression mechanism. The drive shaft may engage the motor and the compression mechanism and may extend through the bearing housing. The motor cooler may be engaged with the bearing housing and may include a pump configured to pump a second working fluid into a cavity surrounding the motor. Rotation of the drive shaft may drive the pump in the motor cooler to pump the second working fluid.

The compressor may include an upper counterweight fixed for rotation with the drive shaft. The upper counterweight may be disposed between the motor and the motor cooler.

The motor cooler may include a pump housing having a central aperture. The pump may be a ring-shaped pump disposed within the central aperture of the pump housing. The pump may be configured to move about a circumference of the central aperture with rotation of the drive shaft.

The compressor may further include an eccentric drive mechanism that is fixed for rotation with the upper counterweight. The eccentric drive mechanism may include an axial sleeve that engages an inner circumference of the pump. Rotation of the eccentric drive mechanism may drive movement of the pump within the pump housing.

The pump may include a projection extending radially from a body of the pump. The pump housing may define a notch in the central aperture. The projection of the pump may be disposed within the notch to prevent rotation of the pump relative to the pump housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Often compressors in refrigeration, or HVAC, systems use gas flowing through the compressor to cool the compressor motor. Other examples may use oil from an oil pump that circulates through the compressor to cool the motor. However, some compressors require additional cooling to keep motor temperatures lower and reduce the potential for overheating or motor failure. The compressor of the present disclosure includes a cooling pump mounted internally to circulate cooled fluid from an external source to an internal area around the compressor motor to reduce motor temperature. In some examples, the cooled fluid may be refrigerant, vapor, or another working fluid.

The cooling pump may operate at the same speed as the compressor. This provides cooling based on the compressor speed rather than a pressure differential.

Figure 1:
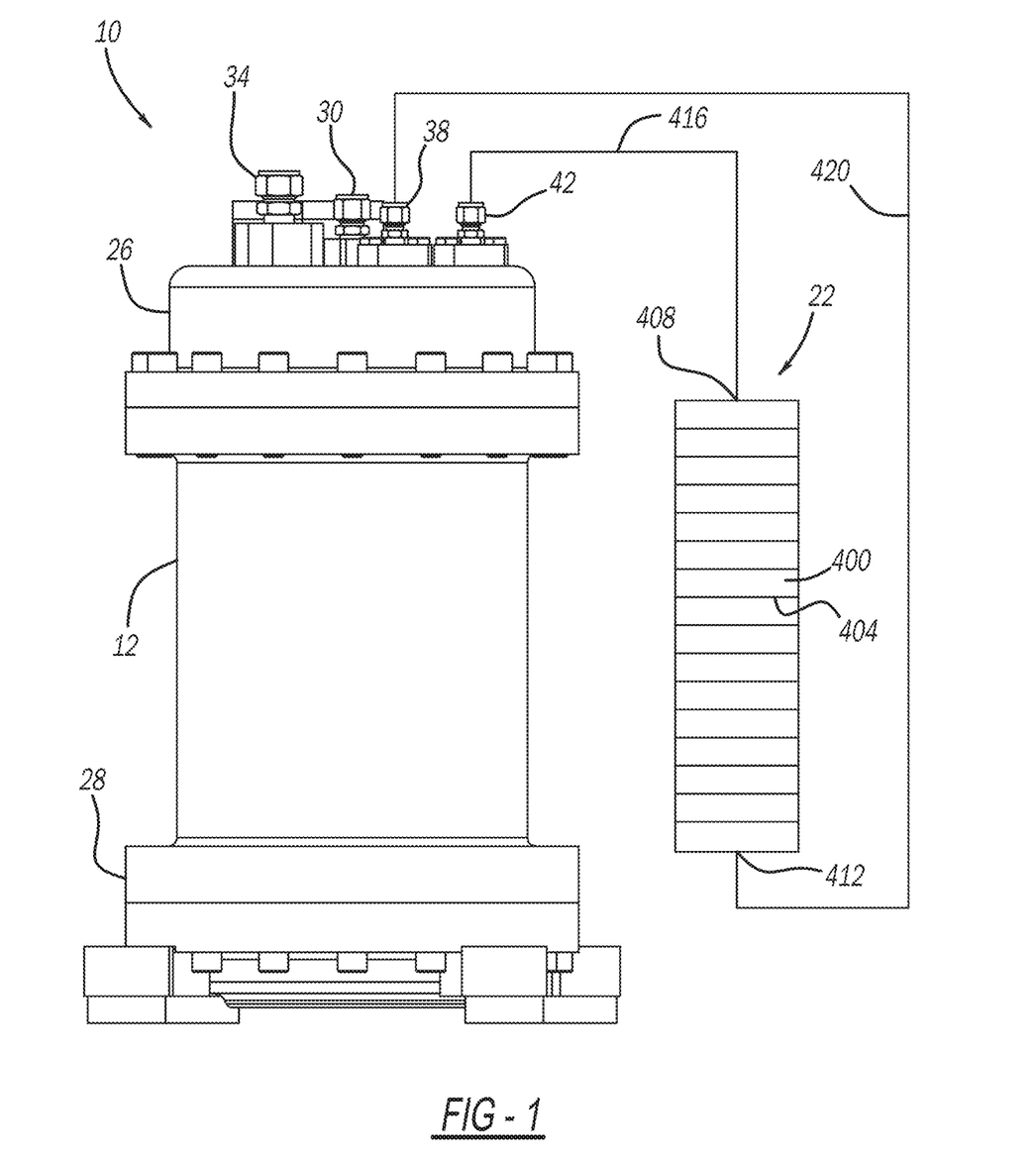
FIG. 1 is a schematic view of an example compressor according to the present disclosure.
Figure 2:
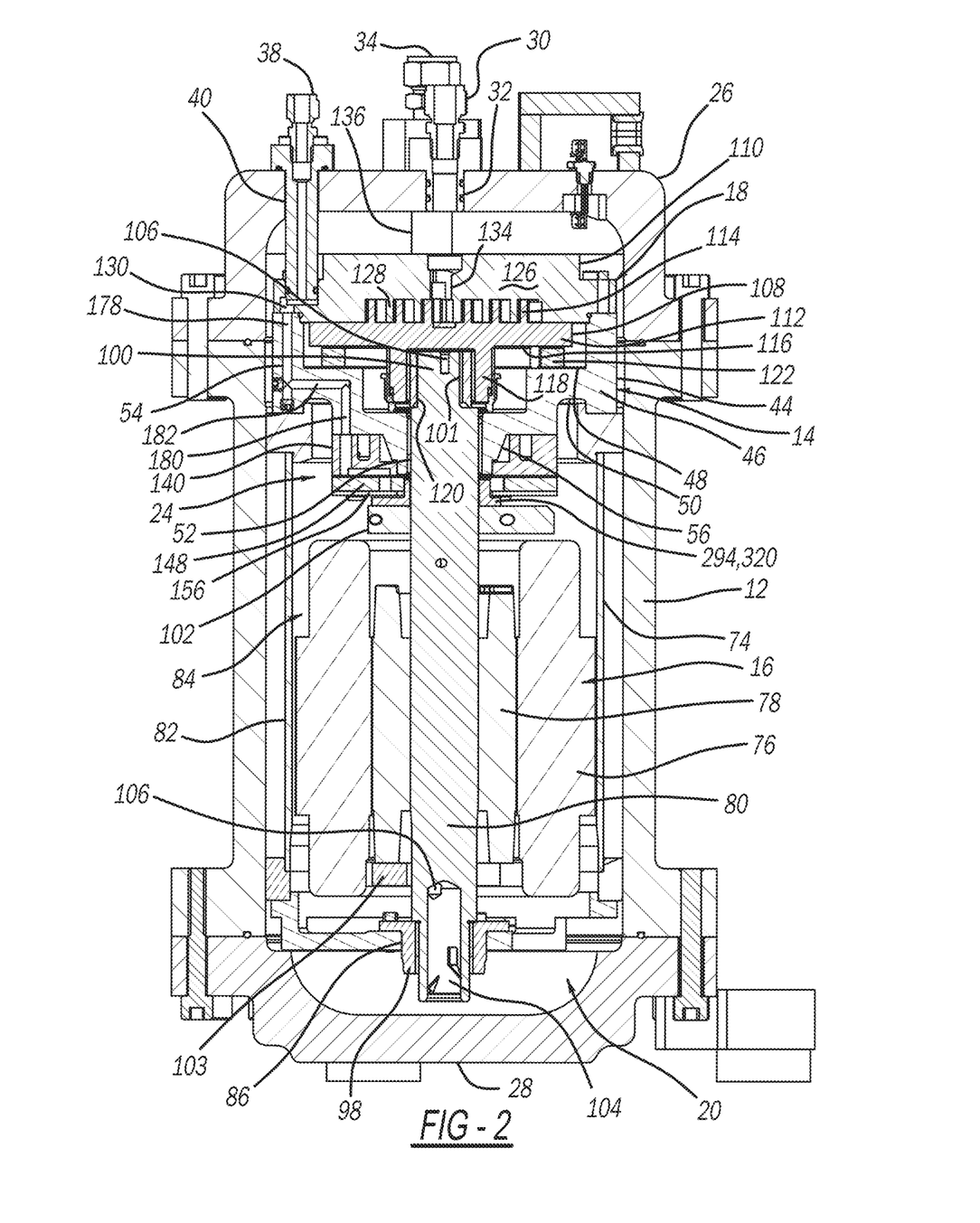
FIG. 2 is a cross-sectional view of the compressor of FIG. 1 cut along a line extending through a first fitting and a discharge fitting of the compressor.
Figure 3:
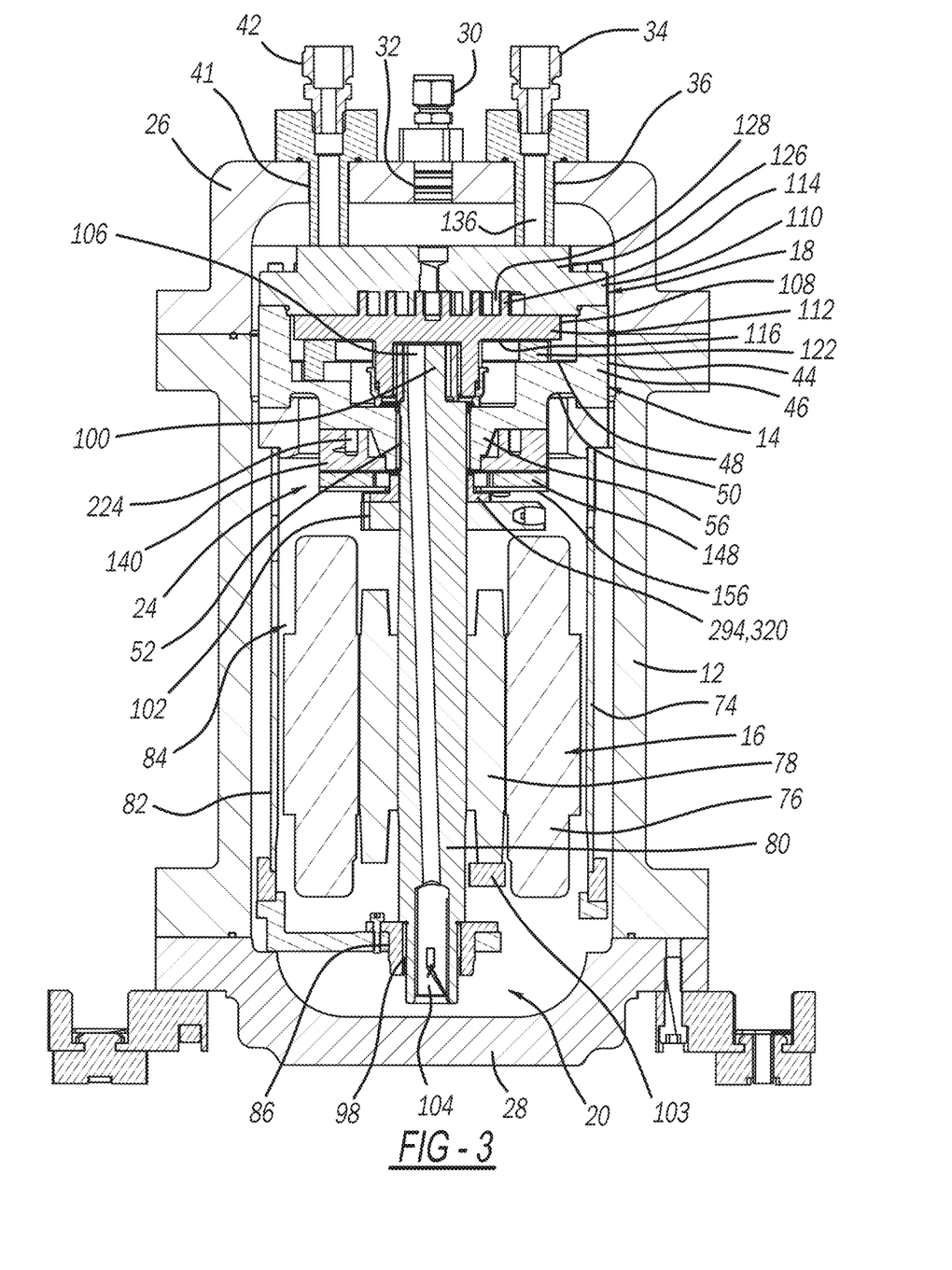
FIG. 3 is a cross-sectional view of the compressor of FIG. 1 cut along a line extending through a suction fitting, the discharge fitting, and a second fitting of the compressor.

Now referring to FIGS. 1-3, a compressor 10 is provided and may include shell assembly 12, a bearing housing assembly 14, a motor assembly 16, a compression mechanism 18, an oil sump 20, a heat exchanger 22, and a cooling assembly 24. The shell assembly 12 defines an internal cavity housing the bearing housing assembly 14, the motor assembly 16, the compression mechanism 18, the oil sump 20, and the cooling assembly 24.

The shell assembly 12 generally forms a compressor housing and may include an end cap 26 and a lower portion 28 having a base or a plurality of feet. A discharge fitting 30 may extend through the shell assembly 12 at a first opening 32 in the end cap 26. A suction fitting 34 may extend through the shell assembly 12 at a second opening 36 in the end cap 26. A first fitting 38 (FIGS. 1-2) may extend through the shell assembly 12 at a third opening 40 in the end cap 26. A second fitting 42 (FIGS. 1 and 3) may extend through the shell assembly 12 at a fourth opening 41 in the end cap 26.

The bearing housing assembly 14 may include a main bearing housing 44. The main bearing housing 44 may be a generally annular member having an outer rim 46, an upper recessed portion 48, a lower recessed portion 50, a main bearing 52, and a lower portion 56. The outer rim 46 may include an aperture 54 extending therethrough along a length of the main bearing housing 44. The lower portion 56 may be a projection extending from the lower recessed portion 50 and housing the main bearing 52.

The motor assembly 16 may include a motor housing 74, a stator 76, and a rotor 78 that cooperate with a drive shaft 80 to selectively cause movement of the compression mechanism 18. The motor housing 74 may include a body portion 82, an internal cavity 84, and a lower, central aperture 86. The body portion 82 may engage the lower portion 28 of the shell assembly 12 and may be fixed thereto via a press-fit, welding, staking, and/or any other suitable means. The body portion 82 may abut the outer rim 46 of the main bearing housing 44 or may be received within the lower recessed portion 50 of the bearing housing 44.

The internal cavity 84 may house the stator 76, the rotor 78, and a portion of the drive shaft 80. The stator 76 may be press-fit into the internal cavity 84 or otherwise fixed therein while the rotor 78 may be press-fit onto the drive shaft 80 or otherwise fixed thereto. The internal cavity 84 may include one or more openings in communication with the internal cavity of the shell assembly 12. The lower, central aperture 86 of the motor housing 74 may be disposed at a lower end of the internal cavity 84 and may house a lower bearing 98.

The drive shaft 80 is rotatably driven by the rotor 78 and may be rotatably supported by the main bearing 52 and the lower bearing 98 relative to the stator 76. The drive shaft 80 may include an eccentric-crank pin 100 having a flat 101 thereon. An upper counterweight 102 may be fixed to the drive shaft 80 at a location between the crank pin 100 and the motor assembly 16 (for example, between the main bearing 52 and the motor assembly 16) and a lower counterweight 103 may be fixed to the drive shaft 80 proximate to the lower bearing 98.

The drive shaft 80 may also include a relatively large diameter concentric bore 104 and a radially outwardly positioned smaller diameter eccentric bore 106 extending generally upwardly from the concentric bore 104 to the top of the drive shaft 80. The eccentric bore 106 may be substantially parallel to a longitudinal axis of the drive shaft 80 or angled relative to the longitudinal axis of the drive shaft 80. Regardless of the particular construction of the eccentric bore 106, the eccentric bore 106 is in fluid communication with the concentric bore 104.

The compression mechanism 18 may generally include an orbiting scroll member 108 and a non-orbiting scroll member 110. The orbiting scroll member 108 may include an end plate 112 having a spiral wrap 114 disposed on an upper surface thereof and an annular thrust surface 116 disposed on a lower surface. A cylindrical hub 118 may project downwardly from the thrust surface 116 and may have a drive bushing 120 rotatably disposed therein. The drive bushing 120 may include an inner bore in which the crank pin 100 is drivingly disposed. The flat 101 may drivingly engage a flat surface (not shown) in a portion of the inner bore of the drive bushing 120 to provide a radially compliant driving arrangement. An Oldham coupling 122 may be keyed to the orbiting scroll member 108 and the non-orbiting scroll member 110 or the main bearing housing 44 to prevent relative rotation between the orbiting and non-orbiting scroll members 108, 110 while allowing relative orbital motion between the orbiting and non-orbiting scroll members 108, 110.

The non-orbiting scroll member 110 may include an end plate 126 having a spiral wrap 128 on a lower surface thereof. The spiral wrap 128 may meshingly engage the spiral wrap 114 of the orbiting scroll member 108, thereby creating a series of moving fluid pockets between the scroll members 108, 110. The fluid pockets created by the spiral wraps 114, 128 may decrease in volume as they move from a radially outer position to a radially inner position throughout a compression cycle of the compression mechanism 18. An aperture 130 (or notch) may extend through the end plate 126 and may correspond to the aperture 54 in the main bearing housing 44 to allow fluid passage therethrough.

A discharge passage 134 may extend axially through the end plate 126 and may be aligned with the first opening 32 in the shell assembly 12 for fluid communication with the discharge fitting 30. A suction passage 136 extends axially through the end plate 126 substantially parallel to the discharge passage 134. While the discharge passage 134 and suction passage 136 are described above as extending in an axial direction, one or both of the discharge passage 134 and the suction passage 136 may extend in a radial direction or angled direction.

The suction passage 136 may be in direct fluid communication with a radially outermost one of the series of moving pockets defined by the spiral wraps 114, 128 and may be aligned with the second opening 36 in the shell assembly 12. The suction fitting 34 is fluidly coupled with the suction passage 136 to allow suction gas entering the compressor 10 via the suction fitting 34 to be substantially fluidly isolated from the internal cavity of the shell assembly 12.

The oil sump 20 may be at least partially defined by the lower portion 28 of the shell assembly 12 and may be filled with a lubricant, such as oil or another fluid, to a predetermined level. The concentric bore 104 of the drive shaft 80 is in fluid communication with the oil sump 20 such that rotation of the drive shaft 80 pumps oil from the oil sump 20, through the concentric bore 104, along the eccentric bore 106, and to the compression mechanism 18 and various other components of the compressor 10 that require lubrication and cooling.

Figure 4:
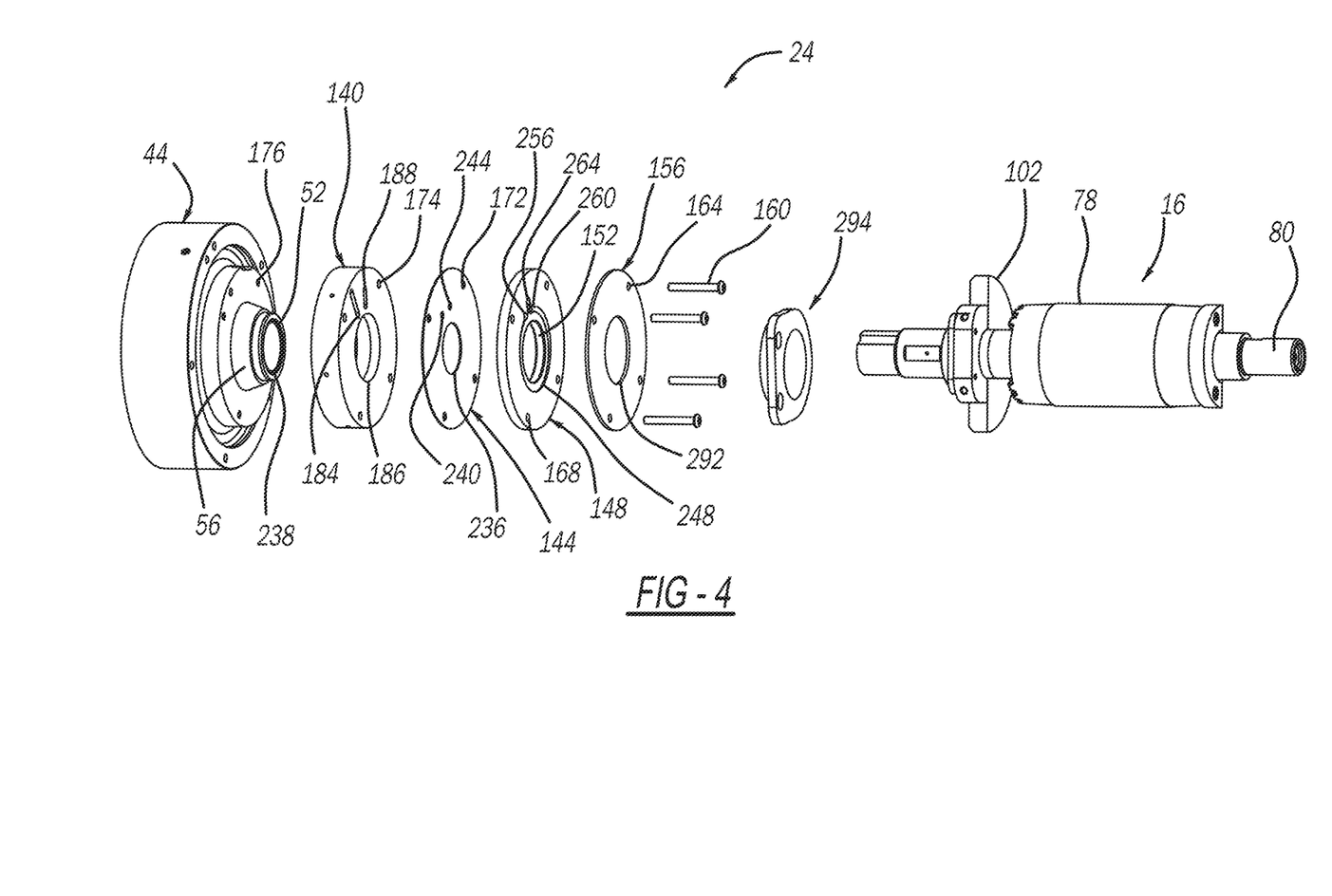
FIG. 4 is an exploded view of a main bearing housing, a cooling assembly, a motor assembly, and a drive shaft of the compressor of FIG. 1.

Referring additionally to FIG. 4, the cooling assembly 24 may be disposed between the compression mechanism 18 and the motor assembly 16, and, more specifically, between the main bearing housing 44 (and including the main bearing housing 44) and the upper counterweight 102. The cooling assembly 24 is shown as an annular assembly disposed above the motor assembly 16 and received in the lower recessed portion 50 of the main bearing housing 44.

The cooling assembly 24 includes a cooling housing 140, an upper thrust plate 144, a pump housing 148, a pump 152, and a lower thrust plate 156. The cooling assembly 24, and more specifically, the main bearing housing 44, the cooling housing 140, the upper thrust plate 144, the pump housing 148, and the lower thrust plate 156 are secured together by a plurality of fasteners 160 that extend through apertures 164 in the lower thrust plate 156, apertures 168 in the pump housing 148, apertures 172 in the upper thrust plate 144, apertures 174 in the cooling housing 140, and apertures 176 in the main bearing housing 44, in that order. The apertures 176 in the main bearing housing 44 engage the fasteners 160 such that the fasteners 160 remain secured within the apertures 176. For example the apertures 176 may threadably engage the fasteners 160, engage the fasteners 160 through a press-fit arrangement, adhesive, or otherwise engage the fasteners 160.

The main bearing housing 44 may include the aperture 54 that is in fluid communication with the first fitting 38. The aperture 54 may be a fluid passage extending longitudinally through the main bearing housing 44. For example, the aperture 54 may include two axial passages 178, 180 (for example upper axial passage 178 and lower axial passage 180) connected by a radial passage 182. The upper axial passage 178 may receive fluid from the first fitting 38, the radial passage 182 may receive fluid from the upper axial passage 178, and the lower axial passage 180 may receive fluid from the radial passage 182.

Figure 5:
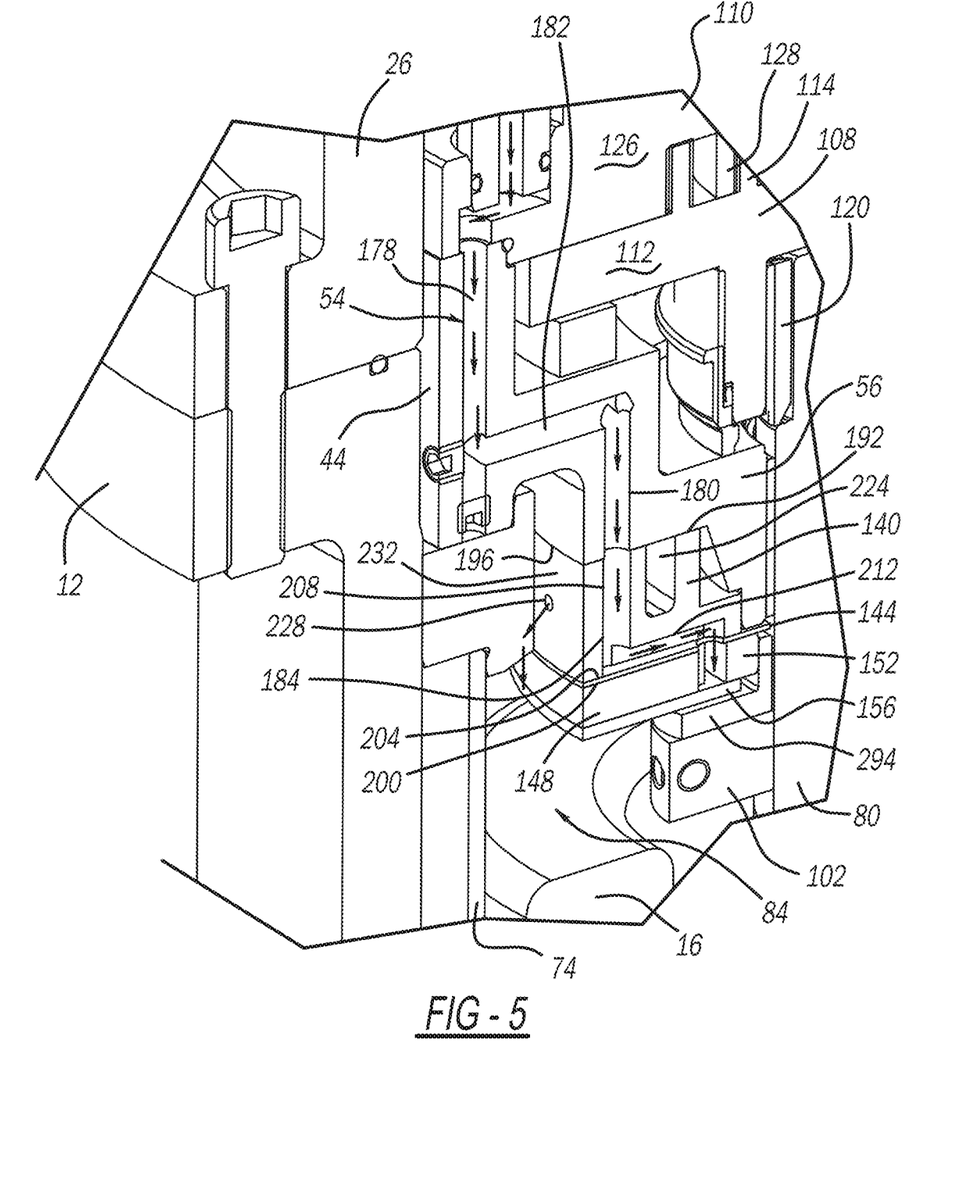
FIG. 5 is a detail view of the compressor of FIG. 1.

The cooling housing 140 may be a cylindrical housing having a central aperture 186 for receiving the lower portion 56 of the main bearing housing 44, the main bearing 52, and the drive shaft 80. The cooling housing 140 may include an inlet slot 184 and an outlet slot 188 for moving fluid through the cooling assembly 24. As shown in FIG. 5, a top surface 192 of the cooling housing 140 may engage a lower surface 196 of the main bearing housing 44 such that the inlet slot 184 may be in fluid communication with the aperture 54, and, more specifically, may be in fluid communication with the lower axial passage 180 of the aperture 54. A bottom surface 200 of the cooling housing 140 may engage with a top surface 204 of the upper thrust plate 144.

The inlet slot 184 may be an L-shaped fluid passage having an axial leg 208 and a radial leg 212. The axial leg 208 may extend parallel with a longitudinal axis of the drive shaft 80. The axial leg 208 may be in fluid communication with the lower axial passage 180 in the main bearing housing 44. The radial leg 212 may extend radially inward from the axial leg 208. The radial leg 212 may receive fluid from the axial leg 208.

Figure 6:
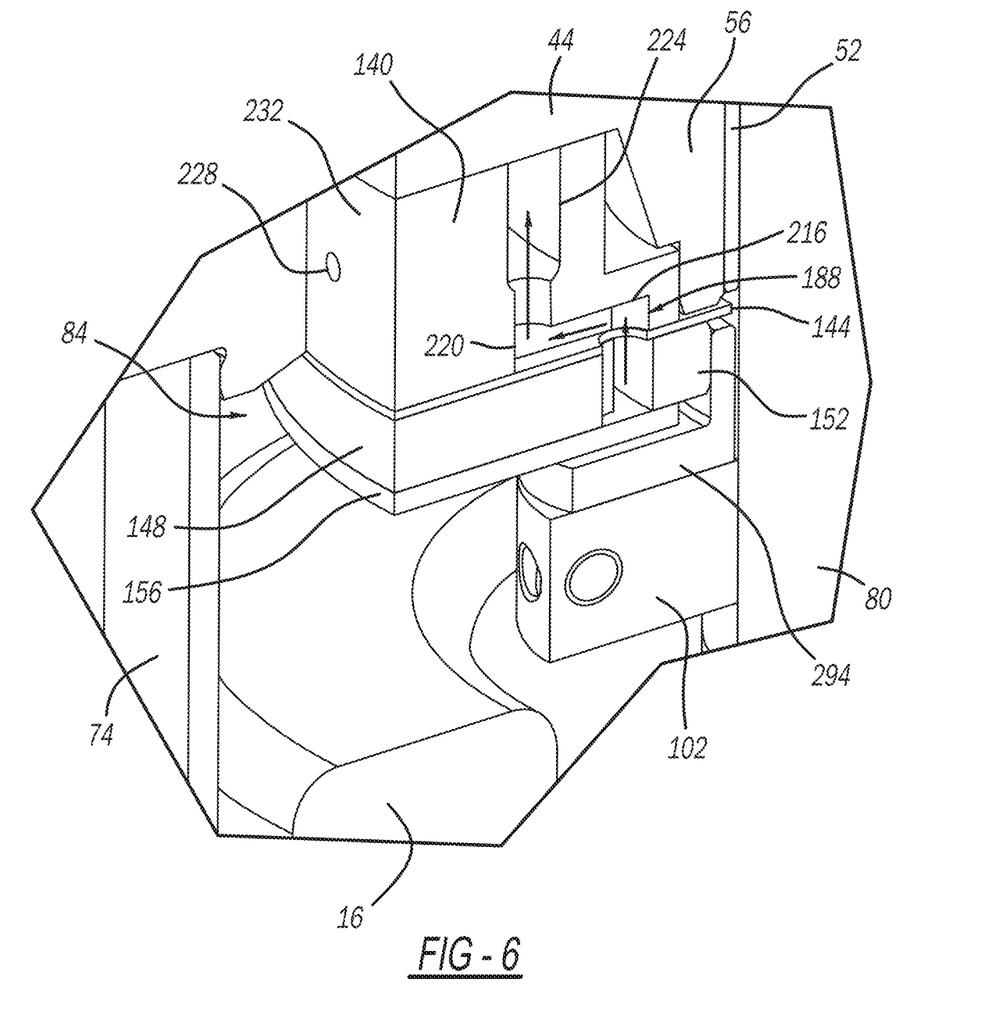
FIG. 6 is a detail view of the compressor of FIG. 1.

With additional reference to FIG. 6, the outlet slot 188 may be an L-shaped slot having a radial leg 216 and an axial leg 220. The radial leg 216 may receive fluid from the upper thrust plate 144 and the axial leg 220 may receive fluid from the radial leg 216. The cooling housing 140 may include an annular channel 224 in fluid communication with the axial leg 220. The annular channel 224 may dissipate fluid annularly about the drive shaft 80. A plurality of apertures 228 may be disposed in a sidewall 232 of the cooling housing 140 around a circumference of the annular channel 224 to provide an exit for fluid to be released within the internal cavity 84 defined by the motor housing 74.

The upper thrust plate 144 may be a ring-shaped thrust plate having a central aperture 236 for receiving the drive shaft 80. The upper thrust plate 144 may be positioned directly adjacent and abutting the cooling housing 140. A base 238 of the main bearing housing 44 may be positioned directly adjacent and abutting the upper thrust plate 144 within the aperture 186 of the cooling housing 140.

The thrust plate 144 may include an inlet aperture, or fluid passage, 240 and an outlet aperture, or fluid passage, 244. The inlet aperture 240 may be in fluid engagement and aligned with the inlet slot 184 in the cooling housing 140, while the outlet aperture 244 may be in fluid engagement and aligned with the outlet slot 188 in the cooling housing 140.

The pump housing 148 may be positioned directly adjacent and abutting the thrust plate 144. The pump housing 148 may be a ring-shaped housing or a cylindrical housing having a central aperture 248 defining a space for receiving the pump 152. An inner wall 252 of the pump housing 148 may define the central aperture 248 and may engage the pump 152. The central aperture 248 of the pump housing 148 may include an inlet notch 256 and an outlet notch 260. The inlet notch 256 may be a circular or oval notch in the inner wall 252 that aligns with and is in fluid communication with the inlet aperture 240 in the upper thrust plate 144. The outlet notch 260 may be a circular or oval notch in the inner wall 252 that aligns with and is in fluid communication with the outlet aperture 244 in the upper thrust plate 144.

A retaining notch 264 may separate or divide the inlet notch 256 from the outlet notch 260. The retaining notch 264 may be formed in the inner wall 252 of the pump housing 148, between the inlet notch 256 and the outlet notch 260. The retaining notch 264 may be configured to receive a portion of the pump 152, as described below. For example, the retaining notch 264 may be a rectangular notch positioned between the circular or oval inlet notch 256 and outlet notch 260.

The pump 152 may include a body 268 and a projection, or tab, 272 and may be disposed within the central aperture 248 of the pump housing 148. The body 268 may be a ring-shaped body that includes a central aperture 276. The central aperture 276 may receive the drive shaft 80 therein. The body 268 may have a consistent thickness about the central aperture 248. An outer diameter of the body 268 may be less than an inner diameter of the central aperture 248 of the pump housing 148 such that there is a gap 280 between the body 268 and the pump housing 148.

The projection, or tab, 272 may project radially from the body 268 and be received within the retaining notch 264. For example, the projection 272 may be a rectangular projection that is received within the rectangular notch 264. As the pump 152 moves with the rotation of the drive shaft 80, the projection 272 maintains an alignment of the pump 152 within the central aperture 248 of the pump housing 148.

Figure 7A:
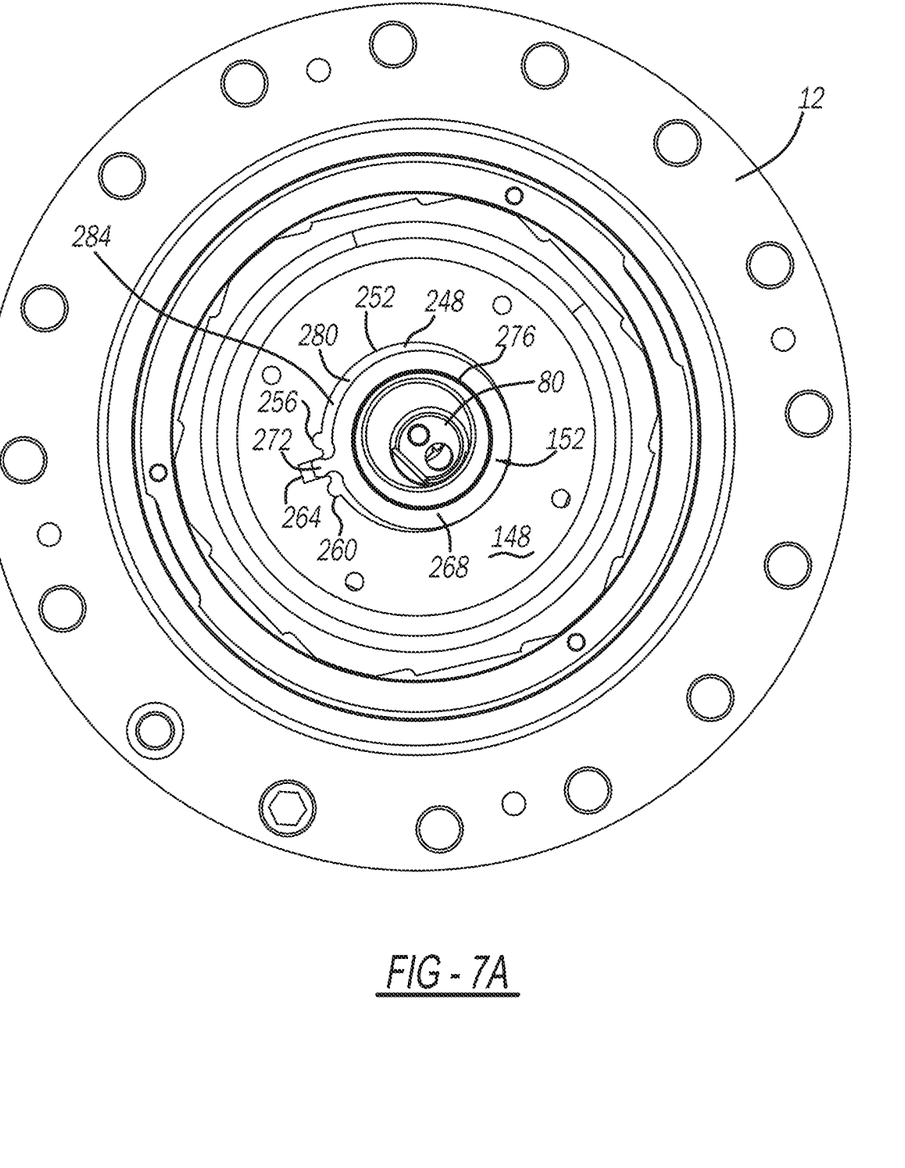
FIG. 7A is a cross-sectional view of the compressor of FIG. 1 with the drive shaft in a first position and cut along a line extending through a shell of the compressor near an intersection between the shell and an end cap of the compressor.
Figure 7B:
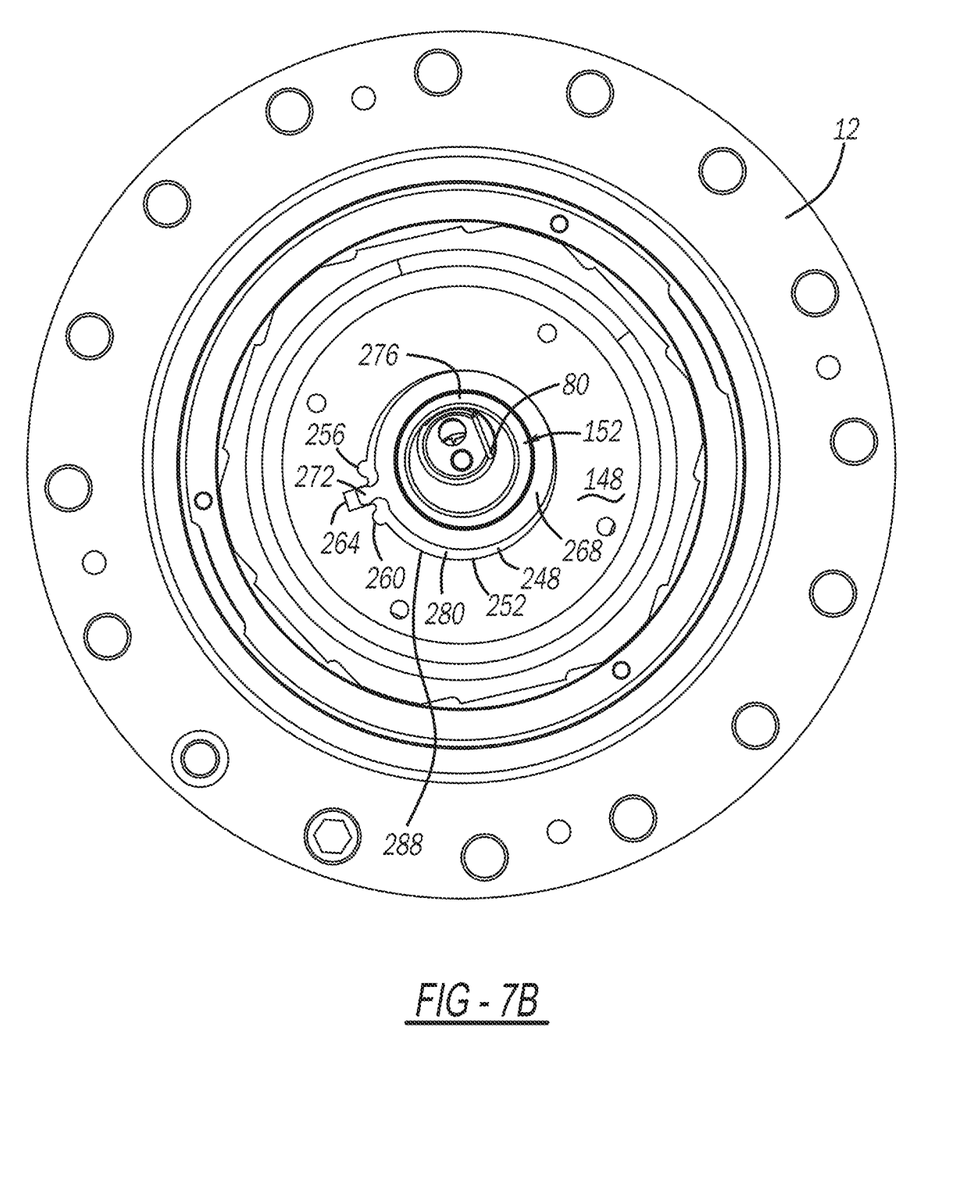
FIG. 7B is a cross-sectional view of the compressor of FIG. 1 with the drive shaft in a second position and cut along the line extending through the shell of the compressor near the intersection between the shell and the end cap of the compressor.
Figures 8A, 8B, 8C:
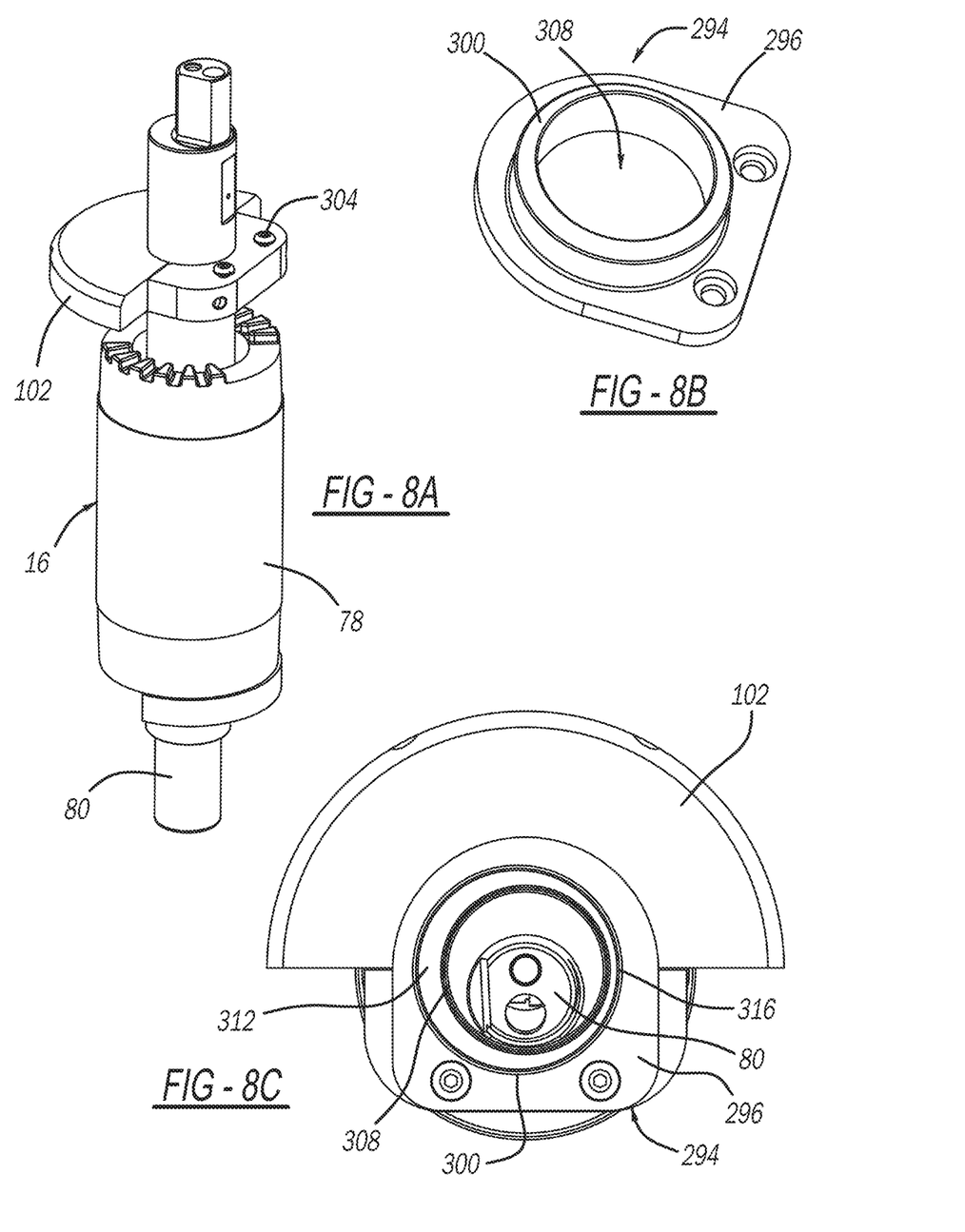
FIG. 8A is a perspective view of a motor assembly, drive shaft, eccentric drive mechanism, and upper counterweight of the compressor of FIG. 1.
FIG. 8B is a perspective view of the eccentric drive mechanism of FIG. 8A.
FIG. 8C is a top view of the motor assembly, drive shaft, eccentric drive mechanism, and upper counterweight of FIG. 8A.
Figures 9A, 9B:
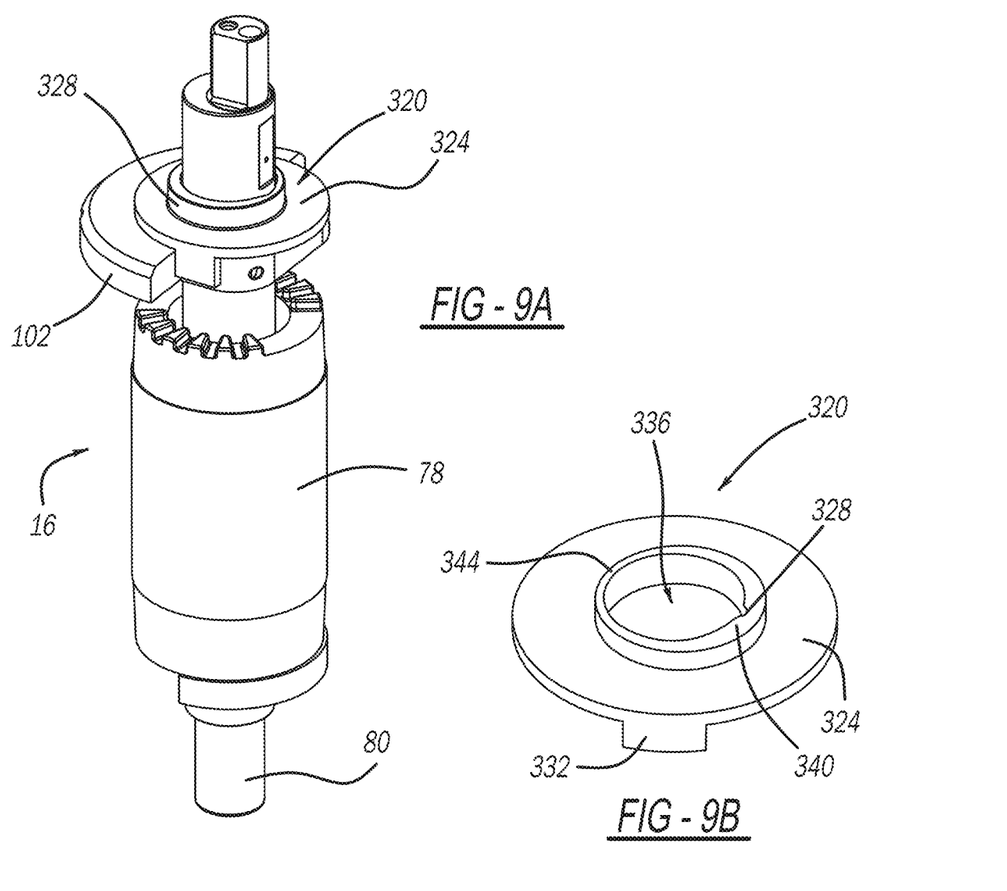
FIG. 9A is a perspective view of a motor assembly, drive shaft, eccentric drive mechanism, and upper counterweight of the compressor of FIG. 1.
FIG. 9B is a top perspective view of the eccentric drive mechanism of FIG. 9A.
Figure 9C:
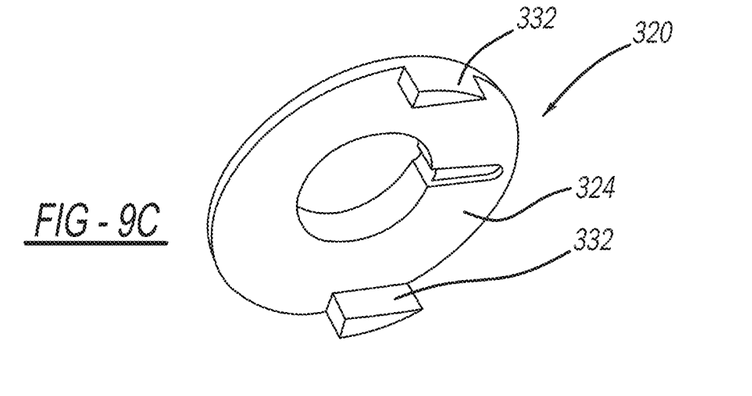
FIG. 9C is a bottom perspective view of the eccentric drive mechanism of FIG. 9A.

With additional reference to FIGS. 7A and 7B, the pump 152 may move with rotation of the drive shaft 80. For example, as the drive shaft 80 rotates, the pump 152 may move in an elliptical or circular pattern within the central aperture 248 of the pump housing 148. In a first position (FIG. 7A), an inlet pocket 284 may be formed by the gap 280 between the body 268 of the pump 152 and the inner wall 252 of the pump housing 148. The inlet pocket 284 may form at the inlet notch 256 such that fluid from the inlet aperture 240 in the upper thrust plate 144 may fill the inlet pocket 284.

As the drive shaft 80 rotates, the pump 152 moves in the circular pattern and the inlet pocket 284 (and gap 280) moves from the inlet notch 256 clockwise around the inner wall 252 of the pump housing 148. Upon a complete revolution of the drive shaft 80 and pump 152, the pump 152 is in a second position (FIG. 7B). In the second position, the inlet pocket 284 becomes an outlet pocket 288 formed at the outlet notch 260 and presses the fluid from the outlet pocket 288 through the outlet notch 260 and to the outlet aperture 244 in the upper thrust plate 144. As the drive shaft 80 continues to rotate, the inlet pocket 284 is again formed at the inlet notch 256.

Referring to FIGS. 2-6, the lower thrust plate 156 is secured directly adjacent to and abutting the pump housing 148. The lower thrust plate 156 cooperates with the pump 152 to form the inlet pocket 284 and outlet pocket 288 by providing a base to the pockets, preventing fluid escape. The lower thrust plate 156 may be a ring-shaped thrust plate having a central aperture 292 for receiving the drive shaft 80.

An eccentric drive mechanism 294, or eccentric driver, or eccentric drive plate, may provide an interface between the lower thrust plate 156 and the upper counterweight 102. Referring to FIGS. 5, 6, and 8A-8C, the eccentric drive mechanism 294 may be a cylindrical drive mechanism, having an L-shaped cross-section. The eccentric drive mechanism 294 may include a radially extending portion 296 and an axially extending portion 300 that projects from the radially extending portion 296. For example, the radially extending portion 296 may be a base that engages and is secured to the upper counterweight 102. For example, the radially extending portion 296 may be a plate or a disc. For example, the radially extending portion 296 may be secured to the upper counterweight 102 by fasteners 304, adhesive, or any other securing method.

The axially extending portion 300 may be a cylindrical portion, or tubular portion, or sleeve, projecting from the radially extending portion 296. The axially extending portion 300 may define a central aperture 308 configured to receive the drive shaft 80 therein. For example, the axially extending portion 300 may be press-fit on the drive shaft 80 to rotate with the drive shaft 80. Alternatively, for example, the fasteners securing the eccentric drive mechanism 294 to the upper counterweight 102 may secure the eccentric drive mechanism 294 for rotation with the drive shaft 80 (through the counterweight 102 being fixed to the drive shaft 80).

The axially extending portion 300 may have a varying thickness about the central aperture 308. For example, the axially extending portion 300 may have a thick section 312 and a thin section 316 and may gradually increase or decrease the thickness between the thick section 312 and the thin section 316. The thick section 312 may be disposed directly opposite to the thin section 316 on the axially extending portion 300. When assembled, the axially extending portion 300 may be inserted within the central aperture 292 of the lower thrust plate 156 and the central aperture 276 of the pump 152, between the drive shaft 80 and the pump 152.

The eccentric drive mechanism 294 rotates with the drive shaft 80 and relative to the pump 152 to move the pump 152. For example, the thick section 312 (FIGS. 7A and 7B) may be aligned on a side of the drive shaft 80 with the eccentric bore 106. As the drive shaft 80 rotates, the thick section 312 rotates within the central aperture 276 of the pump 152 (and rotates relative to the pump 152). The thick section 312 pushes the pump 152 into engagement with the inner wall 252 of the pump housing 148, creating the gap 280 between the pump 152 and the inner wall 252 on the thin section 316 side of the eccentric drive mechanism 294. As the drive shaft 80 rotates, the eccentric drive mechanism 294 rotates and slides within the central aperture 276 of the pump 152 to push different portions (correlating with the location of the thick section 312) of the pump 152 into engagement with the inner wall 252 of the pump housing 148 and moving the gap 280 clockwise around the inner wall 252.

An alternative eccentric drive mechanism 320 may be used in place of the eccentric drive mechanism 294. The eccentric drive mechanism 320 may operate to drive the pump 152, similar to the eccentric drive mechanism 294, but may not be secured to the upper counterweight 102. The eccentric drive mechanism 320 may provide an interface between the lower thrust plate 156 and the upper counterweight 102. Referring to FIGS. 4 and 9A-9C, the eccentric drive mechanism 294 may be an eccentric drive mechanism 320. The eccentric drive mechanism 320 may be a cylindrical drive mechanism, having an L-shaped cross-section. The eccentric drive mechanism 320 may include a radially extending portion 324 and an axially extending portion 328 that projects from the radially extending portion 324. For example, the radially extending portion 324 may be a base that engages the upper counterweight 102.

A plurality of tabs 332 may project from the radially extending portion 324 towards the motor assembly 16. The plurality of tabs 332 may be a pair of tabs 332 spaced such that when the eccentric drive mechanism 320 is assembled on the upper counterweight 102, each of the plurality of tabs 332 contacts the upper counterweight 102 to prevent rotation of the eccentric drive mechanism 320 relative to the upper counterweight 102 and permit or provide rotation of the eccentric drive mechanism 320 with rotation of the upper counterweight 102.

The axially extending portion 328 may be a cylindrical portion projecting from the radially extending portion 324. The axially extending portion 328 may define a central aperture 336 configured to receive the drive shaft 80 therein. For example, the axially extending portion 328 may be press-fit on the drive shaft 80 to rotate with the drive shaft 80. Alternatively, for example, the engagement between the eccentric drive mechanism 320 and the upper counterweight 102 may secure the eccentric drive mechanism 320 for rotation with the drive shaft 80 (through the counterweight 102 being fixed to the drive shaft 80).

The axially extending portion 328 may have a varying thickness about the central aperture 336. For example, the axially extending portion 328 may have a thick section 340 and a thin section 344 and may gradually increase or decrease the thickness between the thick section 340 and the thin section 344. The thick section 340 may be disposed directly opposite to the thin section 344 on the axially extending portion 328. When assembled, the axially extending portion 328 may be inserted within the central aperture 292 of the lower thrust plate 156 and the central aperture 276 of the pump 152, between the drive shaft 80 and the pump 152.

The eccentric drive mechanism 320 rotates with the drive shaft 80 and relative to the pump 152 to move the pump 152. For example, the thick section 340 (FIGS. 7A and 7B) may be aligned on a side of the drive shaft 80 with the eccentric bore 106. As the drive shaft 80 rotates, the thick section 340 rotates within the central aperture 276 of the pump 152 (and rotates relative to the pump 152). The thick section 340 pushes the pump 152 into engagement with the inner wall 252 of the pump housing 148, creating the gap 280 between the pump 152 and the inner wall 252 on the thin section 344 side of the eccentric drive mechanism 320. As the drive shaft 80 rotates, the eccentric drive mechanism 320 rotates and slides within the central aperture 276 of the pump 152 to push different portions (correlating with the location of the thick section 312) of the pump 152 into engagement with the inner wall 252 of the pump housing 148 and moving the gap 280 clockwise around the inner wall 252.

The heat exchanger 22 (shown schematically in the figures) may include a coiled fluid passage 400 and a plurality of fins 404 radiating heat to the ambient environment. The coiled fluid passage 400 may include an inlet 408 (FIG. 1) and an outlet 412 (FIG. 1). The outlet 412 may be in fluid communication with the first fitting 38 via a first conduit 420 while the inlet 408 may be in fluid communication with the second fitting 42 via a second conduit 416 (FIG. 1). In operation, the heat exchanger 22 may receive fluid from the second fitting 42, may cool the fluid, and may return the fluid to the compressor 10 through the outlet 412. For example, fluid from second fitting 42 may be oil or gas or a mixture of both from within the compressor. In other embodiments cooling fluid may be supplied to the first fitting 38 in the form of vapor or liquid sourced from appropriate locations within the refrigeration circuit described in FIG. 10. This fluid would then be returned to the refrigeration circuit vis discharge fitting 30 after being used to provide cooling to the internal cavity 84 defined by the motor housing 74.

Figure 10:
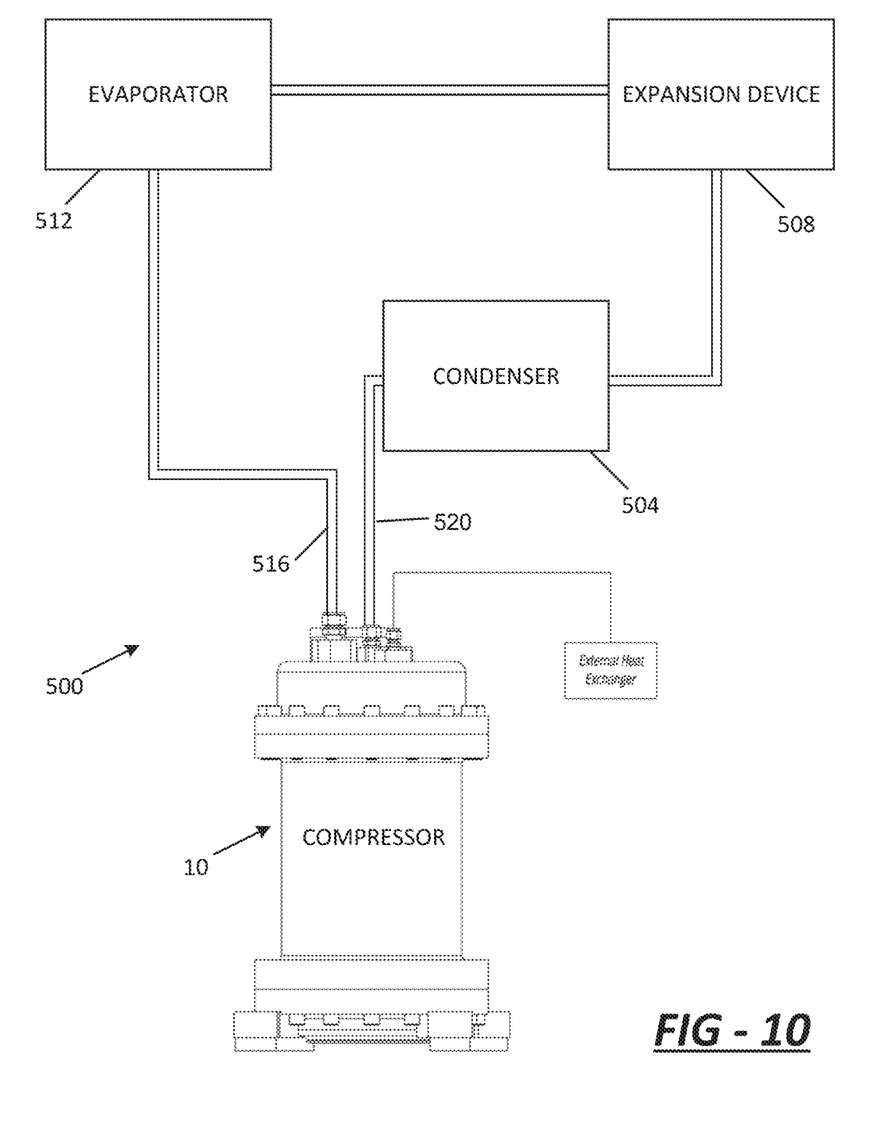
FIG. 10 is a schematic view of an example refrigerant system according to the present disclosure that includes the compressor of FIG. 1.

Referring to FIG. 10, the compressor 10 may be incorporated into a fluid circuit, or refrigeration circuit, 500 that includes a condenser 504, an expansion device 508, and an evaporator 512. The evaporator 512 may be in fluid communication with the suction fitting 34 through a suction line 516. The condenser 504 may be in fluid communication with the discharge fitting 30 through a discharge line 520. The evaporator 512 and the condenser 504 may be in fluid communication through the expansion device 508.

With continued reference to FIGS. 1-10, operation of the compressor 10 and fluid circuit 500 will be described in detail. The compressor 10 circulates a working fluid, such as, for example, a refrigerant or a gas, through the fluid circuit 500. Heat from the working fluid (for example, the high pressure working fluid) is dispersed to the environment at the condenser 504. From the condenser 504, the working fluid flows through the expansion device 508, which reduces the pressure of the working fluid and further decreases the temperature of the working fluid. From the expansion device 508, the working fluid flows to the evaporator 512, where the working fluid absorbs heat from ambient air. From the evaporator 512, suction-pressure working fluid flows through the suction line 516 toward the compressor 10.

The suction-pressure working fluid in the suction line 516 flows through the suction fitting 34 and into the compression mechanism 18 via the suction passage 136. The compression mechanism 18 compresses the working fluid to a discharge pressure and discharges the fluid from the shell assembly 12 through the discharge passage 134 and the discharge fitting 30.

During operation of the compression mechanism 18, oil from the oil sump 20 may be pumped through the motor assembly 16 via the drive shaft 80. As the drive shaft 80 rotates during operation of the compressor 10, oil from the oil sump 20 may be pumped or drawn into the concentric bore 104 of the drive shaft 80 and up through the eccentric bore 106. The oil may spill out of the eccentric bore 106 into the compression mechanism 18 and over the distal end of the drive shaft 80 onto the outside of the drive shaft 80 to lubricate the compression mechanism 18 and drive shaft 80 as they rotate.

As described above, a substantial portion of the suction-pressure fluid entering the compressor 10 is fluidly isolated from the motor assembly 16 and the heat associated with the internal cavity of the shell assembly 12, which improves the volumetric efficiency of the compressor 10. Such heat is generated by operation of the motor assembly 16 and friction from various moving components within the compressor 10. During such operation, a cooling working fluid is provided to the internal cavity 84 defined by the motor housing 74. The cooling working fluid is provided based on compressor speed, or motor speed, rather than a pressure differential. For example, the cooling working fluid may be a liquid or a vapor. Alternatively, for example, the cooling working fluid may be a gas or liquid-gas mixture. For example, the cooling working fluid may include a refrigerant. Alternatively, the cooling working fluid may include an oil or a refrigerant-oil mixture.

As the drive shaft 80 rotates during operation of the compressor 10, the pump 152 moves concentrically within the pump housing 148 by rotation of the eccentric drive mechanism 184. As the pump 152 moves concentrically, the cooling working fluid is pumped in, or sucked in, through the inlet notch 256 in the pump housing 148. The cooling working fluid is transported around the circumference of the central aperture 248 in the pump housing 148 and pumped out, or discharged out, the outlet notch 260 in the pump housing 148.

On the inlet notch 256 side, the cooling working fluid is pumped in from the first fitting 38. The cooling working fluid travels from the first fitting 38, through the aperture 54 in the main bearing housing 44. From the lower axial passage 180 in the main bearing housing 44, the cooling working fluid travels through the axial leg 208 and radial leg 212 of the inlet slot 184 in the cooling housing 140. From the radial slot 212, the cooling working fluid flows through the inlet aperture 240 in the upper thrust plate 144 and into the inlet notch 256 in the pump housing 148.

From the outlet notch 260, the cooling working fluid is pumped through the outlet aperture 244 in the upper thrust plate 144 and into the outlet 188 in the cooling housing 140. The cooling working fluid flows through the radial leg 216 and the axial leg 220 into the annular channel 224, which extends around the drive shaft 80. The pressure of the cooling working fluid pumped from the outlet notch 260 pushes the cooling working fluid in the annular channel 224 to fill the annular channel 224 and exit the annular channel 224 through the apertures 228 spaced about the circumference of the sidewall 232 of the cooling housing 140. As the cooling working fluid exits through the apertures 228, the cooling working fluid is dispersed in the internal cavity 84 defined by the motor housing 74. Heat may be transferred from the motor assembly 16, and more particularly, from the rotor 78, stator 76, and drive shaft 80 to the cooling working fluid to cool the motor assembly 16.

Heated cooling working fluid exits the internal cavity 84 through the second fitting 42 or via discharge fitting 30.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor comprising:
a compression mechanism configured to compress a working fluid;
a motor driving the compression mechanism, the motor being housed within a motor housing;
a drive shaft engaged with the motor and the compression mechanism and being configured to drive operation of the compression mechanism; and
a motor cooler disposed adjacent the motor and configured to pump a cooling working fluid,
wherein the motor cooler includes a pump that pumps the cooling working fluid into the motor housing based on a rotational speed of the drive shaft, and
wherein the pump is disposed between the motor and the compression mechanism.

2. The compressor of claim 1, further comprising:
an upper counterweight fixed for rotation with the drive shaft, the upper counterweight being disposed between the motor and the motor cooler.

3. The compressor of claim 2, wherein the pump is a ring-shaped pump disposed within a central aperture of a pump housing, the pump moving about a circumference of the central aperture with rotation of the drive shaft.

4. The compressor of claim 3, further comprising:
an eccentric drive mechanism fixed for rotation with the upper counterweight,
wherein the eccentric drive mechanism includes an axial sleeve that engages an inner circumference of the pump, and
rotation of the eccentric drive mechanism drives movement of the pump within the pump housing.

5. The compressor of claim 4, wherein the eccentric drive mechanism is fixed to the upper counterweight by a fastener.

6. The compressor of claim 4, wherein the eccentric drive mechanism includes a plurality of tabs projecting from a radially-extending base, the plurality of tabs engaging the upper counterweight to prevent relative rotation between the eccentric drive mechanism and the upper counterweight.

7. The compressor of claim 1, further comprising:
a shell housing the motor, the drive shaft, and the motor cooler.

8. The compressor of claim 7, wherein the motor cooler is fluidly connected to a heat exchanger external to the shell.

9. The compressor of claim 1, wherein the cooling working fluid is a gas or a liquid-gas mixture.

10. The compressor of claim 1, wherein the cooling working fluid includes a refrigerant.

11. A compressor motor cooler comprising:
a cooling housing having a fluid inlet and a fluid outlet;
a pump housing having a central aperture defining an inlet notch and an outlet notch;
a pump disposed within the central aperture and moving about a circumference of the central aperture to pump a working fluid from the fluid inlet, through the inlet notch, about the central aperture, through the outlet notch, and to the fluid outlet; and
an upper thrust plate disposed between the cooling housing and the pump housing, the upper thrust plate having an inlet aperture aligning with the fluid inlet of the cooling housing and the inlet notch of the pump housing and an outlet aperture aligning with the fluid outlet of the cooling housing and the outlet notch of the pump housing.

12. The compressor motor cooler of claim 11, further comprising:
a lower thrust plate disposed on a side of the pump housing opposite the upper thrust plate,
wherein the lower thrust plate, the pump housing, the upper thrust plate, and the cooling housing are fixed together.

13. The compressor motor cooler of claim 11, wherein the cooling housing includes an annular channel in fluid communication with the fluid outlet and configured to receive fluid from the fluid outlet and disperse fluid about a circumference of the cooling housing.

14. The compressor motor cooler of claim 12, wherein the cooling housing includes a plurality of exit apertures in fluid communication with the annular channel.

15. A compressor comprising:
a compression mechanism configured to compress a first working fluid;
a bearing housing engaged with the compression mechanism;
a motor;
a drive shaft engaging the motor and the compression mechanism and extending through the bearing housing;
a motor cooler engaged with the bearing housing, the motor cooler including a pump configured to pump a second working fluid into a cavity surrounding the motor;
an upper counterweight fixed for rotation with the drive shaft; and
an eccentric drive mechanism fixed for rotation with the upper counterweight,
wherein the eccentric drive mechanism includes an axial sleeve that engages an inner circumference of the pump,
wherein rotation of the eccentric drive mechanism movement of the pump within the pump housing, and
wherein rotation of the drive shaft drives the pump in the motor cooler to pump the second working fluid.

16. The compressor of claim 15, wherein
the upper counterweight is disposed between the motor and the motor cooler.

17. The compressor of claim 16, wherein
the motor cooler includes a pump housing having a central aperture,
the pump is a ring-shaped pump disposed within the central aperture of the pump housing, and
the pump is configured to move about a circumference of the central aperture with rotation of the drive shaft.

18. The compressor of claim 17, wherein
the pump includes a projection extending radially from a body of the pump,
the pump housing defines a notch in the central aperture, and
the projection of the pump is disposed within the notch to prevent rotation of the pump relative to the pump housing.

* * * * *